United States Patent [19]

Kagota et al.

[11] Patent Number: 4,640,714

[45] Date of Patent: Feb. 3, 1987

[54] ALCOHOL-BASED FLEXOGRAPHIC INK FOR USE IN BACKCARBON PAPERS

[75] Inventors: Nobuhiro Kagota; Hideaki Senoh, both of Takasago, Japan

[73] Assignee: Mitsubishi Paper Mills, Ltd., Tokyo, Japan

[21] Appl. No.: 643,276

[22] Filed: Aug. 22, 1984

[30] Foreign Application Priority Data

Aug. 24, 1983 [JP] Japan ............................... 58-155497

[51] Int. Cl.⁴ ............................................... C09D 11/12

[52] U.S. Cl. ..................................... 106/21; 106/14.5; 346/214; 346/215; 427/149; 427/150

[58] Field of Search ................. 106/21, 14.5; 346/214, 346/215; 427/148, 149, 150, 152; 428/438

[56] References Cited

U.S. PATENT DOCUMENTS 3,943,080 3/1976 Wismer et al. ...................... 525/441
4,003,846 1/1977 Kuhn et al. ......................... 427/151
4,021,245 5/1977 Nagatomo et al. ................. 430/523
4,421,560 12/1983 Kito et al. ............................ 106/21

FOREIGN PATENT DOCUMENTS 57-203588 12/1982 Japan .

*Primary Examiner*—Amelia B. Yarbrough
*Attorney, Agent, or Firm*—Cushman, Darby & Cushman

[57] ABSTRACT

When a transferred image is formed on a plain paper by the use of a colorless backcarbon paper coated with an alcohol-based flexographic ink composed essentially of (A) microcapsules whose core substance is an oil droplet containing an electron-donating organic color former, (B) microcapsules whose core substance is an oil droplet containing an electron-accepting organic color developer, (C) a binder resin and (D) a solvent composed mainly of a lower alcohol of 1 to 3 carbon atoms, the density of the transferred image is improved by adding an appropriate amount of a wax to the core substance(s) of either or both of the above microcapsules (A) and (B).

11 Claims, 1 Drawing Figure

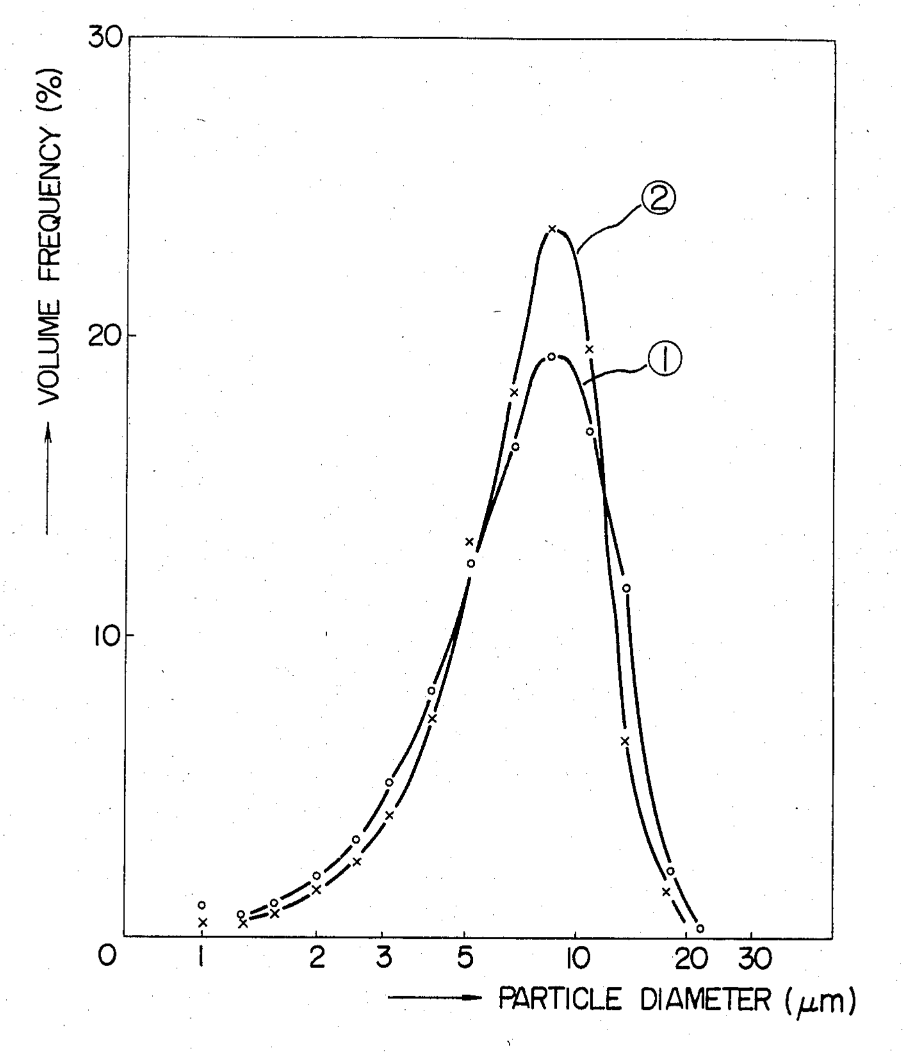
30
20
10
0
VOLUME FREQUENCY (%)
1
2
3
5
10
20
30
PARTICLE DIAMETER (μm)
②
①

ALCOHOL-BASED FLEXOGRAPHIC INK FOR USE IN BACKCARBON PAPERS

BACKGROUND OF THE INVENTION

1. Field of the Invention

The present invention relates to an alcohol-based flexographic ink for use in colorless backcarbon papers.

2. Description of the Prior Art

In general, backcarbon papers are papers prepared by locally coating only the required parts of the back side of a thin form paper with a hot melt type ink having a dark color of indigo, black, red or the like by the use of a letterpress printer or a gravure printer. When the back side (coated side) of a backcarbon paper is superimposed on plain paper and manual printing or typewriter printing is applied on the front side of the backcarbon paper, a transferred inage is formed on the plain paper.

In these backcarbon papers, because the fairly large part of their back side is coated with an ink of dark color, the ink can be seen through even at the front side. This makes it difficult to read letters printed on the front side and gives an unpleasant feeling.

On the other hand, so-called carbonless papers are colorless before use and, by applying manual printing on these papers, there is formed a transferred image of blue, black, red or the like on a plain paper. Hence, in Japan, as form papers, carbonless papers are now in wider use than backcarbon papers.

However, in carbonless papers, it is generally necessary to prepare three kinds of papers, namely, an upper paper coated at the whole part of the back side with microcapsules containing an oil droplet containing a colorless dye (electron-donating organic color former), a lower paper coated at the whole part of the front side with an electron-accepting organic color developer and a middle paper having two functions of the upper and lower papers. Moreover, it is necessary at the time of actual form paper production to apply to parts requiring no copying a treatment for prevention of copying called "desensitization printing", which is not desirable from the standpoints of productivity of form paper production and energy saving.

Hence, there has been desired a copying paper having only respective advantages of a backcarbon paper and a carbonless paper, namely, a paper not requiring a combination of an upper paper, a middle paper and a lower paper and locally coated with a colorless ink only at the required parts of the back side.

Such a colorless backcarbon paper was proposed by the present inventor in Japanese Laid-open Patent Publication No. 203588/1982 (title of the invention: Carbonless Pressure-Sensitive Transfer Sheet). This backcarbon paper of prior art is obtained by coating the whole surface or part of a substrate sheet with a flexographic ink produced by dispersing and/or dissolving (A) microcapsules containing an oil droplet containing an electron-donating organic color former, (B) microcapsules containing an oil droplet containing an electron-accepting organic color developer and (C) a binder, in a solvent composed mainly of a low boiling alcohol of 1 to 3 carbon atoms. When a pressure is applied to the front side of the above backcarbon copying paper, the two kinds of the colorless microcapsules (A) and (B) on the backside of the copying paper are destroyed and the two kinds of the oil droplets contained in the microcapsules (A) and (B) come in contact with each other developing a color, and the color is transferred onto a plain paper placed beneath the copying paper whereby a transferred image is formed on the plain paper. However, further improvement of the density of this transferred image has been desired.

SUMMARY OF THE INVENTION

An object of the present invention is to provide an ink of the same type as the alcohol-based flexographic ink used in the backcarbon paper disclosed in Japanese Laid-open Patent Application No. 203588/1982 but of improved performance, particularly, an alcohol-based flexographic ink suitable for production of a colorless backcarbon paper capable of forming a transferred image of improved density.

The above object of the present invention has been attained by allowing either or both of the microcapsules containing an oil droplet containing an electron-donating organic color former and the microcapsules containing an oil droplet containing an electron-accepting organic color developer to further contain an appropriate amount of a wax.

The present invention relates to an alcohol-based flexographic ink for use in colorless backcarbon papers which is composed essentially of (A) microcapsules whose core substance is an oil droplet containing an electron-donating organic color former, (B) microcapsules whose core substance is an oil droplet containing an electron-accepting organic color developer, (C) a binder resin and (D) a solvent composed mainly of a lower alcohol of 1 to 3 carbon atoms, characterized in that either or both of the core substances of the microcapsules (A) and (B) contain an appropriate amount of a wax.

When the addition of the wax to the core substance(s) of either or both of the two kinds of the microcapsules is combined with the addition of a phosphoric acid ester compound to flexographic ink which was proposed by the present inventor in Japanese Laid-open Patent Application No. 203588/1982, the flexographic ink of the present invention can provide a backcarbon paper capable of forming a transferred image of further improved density.

BRIEF DESCRIPTION OF THE DRAWING

FIG. 1 shows a particle diameter distribution of the color developer microcapsules prepared in Example 1 (2), wherein a curve (1) is for color developer microcapsules No. (2)-1 whose core substance contains no wax and a curve (1) is for color developer microcapsules No. (2)-2 whose core substance contains a n-paraffin as a wax at a proportion of 100 parts of core substance to 5 parts of n-paraffin.

DETAILED DESCRIPTION OF THE INVENTION

The alcohol-based flexographic ink of the present invention is characterized in that the microcapsules present in the ink contain an appropriate amount of a wax in order to improve image transferability from a transfer paper (image-donating paper) coated with the ink to a plain paper (image-accepting paper).

This wax containment in microcapsules is generally performed as follows. That is, an appropriate amount of a wax is added to a solution of an electron-donating organic color former in a non-volatile solvent and/or a solution of an electron-accepting organic color developer in a non-volatile solvent. The mixture(s) is(are)

heated to make it an oily substance as uniform as possible. The oily substance is added to an aqueous phase and is dispersed therein to form an emulsion containing fine oil droplets. Then, the emulsion is subjected to encapsulation to obtain one or two kinds of microcapsules. At this time, wax addition enables the quick formation of an emulsion having a narrow particle diameter distribution. Further, microcapsules obtained are damaged to a lesser extent and a superior shell film is formed. Thus, wax addition brings about not only the improvement of image transferability but also other advantages mentioned above.

The amount of a wax added is not particularly restricted and can be determined by experiments so as to satisfy desired image transferability, quality designs, product designs, etc. Generally, the amount is 50% by weight or less, particularly 2 to 20% by weight based on the amount of an internal phase (core substance) of microcapsule.

The type of a wax added is not particularly restricted. There can be used at least one wax selected from the group consisting, for example, of natural and synthetic waxes of petroleum, mineral, animal and vegetable, and other origins all having a melting point of 40° C. or higher. Specifically, there can be used at least one wax selected from the following natural and synthetic waxes. Animal waxes such as bees wax, spermaceti, Chinese insect wax, shellac wax and the like; vegetable waxes such as carnauba wax, ouricury wax, candelilla wax, Japan wax, cane wax, rice wax and the like; mineral waxes such as montan wax, ozokerite, ceresine and the like; petroleum waxes such as paraffin wax, microcrystalline wax and the like; synthetic hydrocarbon waxes such as Fischer-Tropsch wax, its derivative, a low molecular weight polyethylene, its derivative and the like; modified waxes such as a montan derivative, a micro wax derivative, an oxidized synthetic paraffin and the like; a polyethylene glycol; fatty acid esters and glycerides such as stearic acid-sorbitol and the like; hydrogenated waxes such as castor wax, opal wax and the like; amines and amides such as acra wax, armo wax and the like; an atactic polypropylene; an α-olefin wax; a halogenated hydrocarbon; a stearamide; an ethylenebisstearamide; stearic acid; a metal salt of stearic acid; etc. The wax used in the present invention is not restricted to the above mentioned waxes.

The ink of the present invention is limited to use in flexography. The reason is as follows. In order for the ink of the present invention to be used in other printing methods such as, for example, letterpress printing and lithography, the ink must be kneaded with other materials such as a vehicle, a pigment, a binder and the like and this kneading inevitably causes destruction of microcapsules. Experiments showed that flexography is safest in terms of microcapsules destruction. The ink of the present invention may optionally be used also in gravure printing.

The ink of the present invention uses a solvent composed mainly of an alcohol. It is because alcohols have various advantages such as being more volatile than water, giving no wrinkles on a substrate while water is likely to cause wrinkles particularly at the peripheries of printed parts, being more hygienic than other organic solvents, having long been used in the printing industry and the like. The use of this solvent composed mainly of an alcohol was enabled by the use of a synthetic resin shell film (described later) for microcapsules in place of conventional gelatin-based shell films.

As the encapsulation method usable in the present invention, there can be mentioned, for example, coacervation methods described in U.S. Pat. No. 2800457, U.S. Pat. No. 2800458, etc., interfacial polymerization methods described in Japanese Patent Publication Nos. 19574/1963, 4463/1967, 771/1967 and 1763/1972, etc., and monomer polymerization methods described in Japanese Patent Publication No. 9168/1961, Japanese Laid-open Patent Application No. 9079/1976, etc. More preferably there can be mentioned an encapsulation method adopting microcapsules having a film of a condensation product between a polyhydroxy aromatic compound and an aldehyde described in Japanese Patent Publication No. 30030/1975, a method adopting microcapsules having a film of an ureaformaldehyde resin described in U.S. Pat. No. 4001140, and a method adopting microcapsules having a film of a melamine-formaldehyde resin described in Japanese Laidopen Patent Application Nos. 84881/1978 and 49984/1979, etc. These microcapsules adopted in the above more preferable encapsulation methods are very stable even in low boiling alcohols, which enabled the alcohol-based flexographic ink of the present invention to possess a very long life.

The microcapsules of the present invention can be produced in the form of an aqueous dispersion of high solid content. Alternatively, they may be produced in the form of a powder by the use of, for example, a spray drying method.

As the color former, there can optionally be used a leuco dye which is a colorless or light-colored, electron-donating, color-forming organic compound and which can be used in pressure-sensitive copying papers. Its specific examples include triarylmethane compounds such as 3,3-bis(p-dimethylaminophenyl)-6-dimethylaminophthalide (so-called Crystal Violet Lactone), 3,3-bis(p-dimethylaminophenyl)phthalide and the like; diphenylmethane compounds such as 4,4'-bis-dimethylaminobenzhydrinbenzylether and the like; xanthene compounds such as Rhodamine-B-anilinolactam, rhodamine-(p-nitroanilino)lactam, 7-dimethylamino-2-methoxyfluoran, 3-diethylamino-6-methyl-7-anilinofluoran and the like; thiazine compounds such as benzoylleucomethyleneblue and the like, and spiropyran compounds such as 3-methyl-spiro-dinaphthopyran and the like.

As the color developer, there can be used a conventionally known color developer such as a substituted phenol-formaldehyde resin described in Japanese Patent Publication No. 20144/1967, a multivalent metal salt of a salicylic acid derivative described in Japanese Patent Publication No. 25174/1976, a zinc or nickel salt of 2 2,2'-bisphenolsulfone compound described in Japanese Laid-open Patent Application No. 113591/1980, or the like. Preferable specific examples of the color developer include phenolic compounds such as a p-phenylphenolformaldehyde resin, 3,5-di-tert-butylsalicylic acid and its zinc salt, 3,5-di-(α-methylbenzyl)salicylic acid and its zinc salt and the like.

As the non-volatile solvent used in the internal phase of microcapsules, there can be mentioned oil type solvents widely used in carbonless papers which have excellent solvency for color formers and color developers and do not hinder their color developability, such as arylmethane solvents (e.g. HISOL SAS manufactured by Nippon Petrochemicals Co., Ltd.), alkylnaphthalene solvents (e.g. KMC Oil manufactured by Kureha Chemical Industry), alkyldiphenyl solvents, triphenyl solvents, chlorinated paraffin solvents and the like.

In a preferred embodiment of the present invention, there is used a mono-, di- or tri-ester between an aliphatic alcohol whose alkyl group has 6 to 18 carbon atoms and phosphoric acid or a salt of the ester. These substances are generally used as a mold release agent for high molecular resins. They are soluble in alcohols and can strikingly enhance the density of a transferred image probably because of their oil-repelling property.

As the salt of the above-mentioned ester, there can be cited, for example, salts with metals such as sodium, potassium, calcium, magnesium and the like as well as salts with organic bases such as ethylamine, diethylamine, triethylamine, n-butylamine, diamylamine, ethylenediamine, propylenediamine, cyclohexylamine, pyridine, monoethanolamine, diethanolamine, triethanolamine and the like.

The amount of the ester or its salt added is 10 to 200 parts, preferably 30 to 80 parts based on 100 parts of the total solid of color former microcapsules and color developer microcapsules.

As the binder, there is selected a compound generally used in flexographic inks, from among natural and synthetic high molecular compounds which are soluble in water and/or alcohols. Its examples include polyvinyl acetates, modified polyvinyl alcohols, ethyl cellulose, nitrocellulose, hydroxypropyl cellulose, polyvinyl butyrals, polyvinyl pyrrolidones, ethylene-maleic anhydride copolymers, styrene-maleic anhydride copolymers, methyl vinyl ether-maleic anhydride copolymers, etc.

As the solvent used in the ink of the present invention, a low boiling alcohol such as methyl alcohol, ethyl alcohol or the like is used as a main component. A small amount of water may also be contained in the solvent. For controlling the drying property of an ink, a small amount of n-propyl alcohol or iso-propyl alcohol is often contained in the solvent. Further, a small amount of an organic solvent such as methyl acetate, ethyl acetate, butyl acetate, methyl cellosolve, ethyl cellosolve or the like may be contained in the solvent.

There may further be added to the ink of the present invention a protecting agent for microcapsules such as a cellulose powder, a starch or a powder of calcinated kaoline, calcium carbonate, or wax having particle diameters of, for example, 5 to 20 μm.

To the ink of the present invention may furthermore be added, as necessary, a dispersing agent, a defoamant, an ultraviolet light absorber, an antioxidant, a fluorescent dye, a white pigment and the like.

The microcapsules used in the present invention can have an optional particle diameter. In general, a somewhat large diameter tends to give a high transferred image density. However, too large a diameter not only aggravates smudge but also reduces a transferred image density. A preferred diameter range is 3 to 15 μm in terms of average particle diameter and optimally 6 to 10 μm. When microcapsules give a broad particle diameter distribution curve, there can not be obtained a good balance between color development and smudge. However, when the core substance of microcapsules contains a wax, the resulting microcapsules give a very narrow particle diameter distribution curve and a good balance of color development and smudge can be obtained.

The present invention will specifically be explained below by way of Examples. Parts in the Examples refer to parts by weight.

EXAMPLE 1

(1) Preparation of color former microcapsules

12 Parts of Crystal Violet Lactone was dissolved with heating in 88 parts of a mixture between HISOL SAS N-296 (a high boiling solvent for pressure-sensitive recording materials, manufactured by Nippon Petrochemicals Co., Ltd.) and a wax shown in Table 1, whereby 100 parts of an oily internal phase, namely, a core substance was obtained.

This substance was dispersed in 100 parts of a 5% aqueous solution of pH 5.5 containing a styrene-maleic anhydride copolymer and a small amount of sodium hydroxide to obtain an emulsion.

Separately, 7 parts of melamine and 18 parts of 37% formalin were added to 30 parts of water. The mixture was adjusted to pH 9.0 with sodium hydroxide and heated for 15 min to obtain a melamine-formaldehyde precondensate. This precondensate was added to the above prepared emulsion. The mixture was kept at 60° C. for 2 hr and then at 85° C. for 1 hr, whereby color former microcapsules No. (1)-1 to (1)-4 were formed. Respective microcapsules had average particle diameters as shown in Table 1.

TABLE 1

| Color former microcapsules | Wax and its amount in 100 parts of oily internal phase, namely, core substance | | Average particle diameter (μm) |
|---|---|---|---|
| No. (1)-1 | — | | 7.0 |
| No. (1)-2 | — | | 8.5 |
| No. (1)-3 | n-Paraffin (m.p. 52° C.) | 10 parts | 8.5 |
| No. (1)-4 | Rice wax | 10 parts | 8.5 |

(2) Preparation of color developer microcapsules

40 Parts of a p-phenylphenol-formaldehyde resin was dissolved with heating in 60 parts of a mixture between HISOL SAS N-296 and a wax shown in table 2, whereby 100 parts of an oily internal phase, namely, a core substance was obtained. This substance was subjected to encapsulation in the same manner as in the above (1) to obtain color developer microcapsules Nos. (2)-1 to (2)-4.

TABLE 2

| Color developer microcapsules | Wax and its amount in 100 parts of oily internal phase, namely, core substance | | Average particle diameter (μm) |
|---|---|---|---|
| No. (2)-1 | — | | 8.0 |
| No. (2)-2 | n-Paraffin (m.p. 52° C.) | 5 parts | 8.0 |
| No. (2)-3 | n-Paraffin (m.p. 52° C.) | 10 parts | 8.0 |
| No. (2)-4 | Rice wax | 10 parts | 8.0 |

(3) Preparation of flexographic ink for backcarbon paper

The color former microcapsules obtained in the above (1) and the color developer microcapsules obtained in the above (2) were combined as shown in Table 3. Using each combination and in accordance with the following formulation, there were prepared 8 kinds of alcohol-based flexographic inks for use in colorless backcarbon paper.

| | |
|---|---|
| Color former microcapsules obtained in (1) | 20 parts |
| Color developer microcapsules obtained in (2) | 80 parts |
| Modified vinyl acetate derivative (Corponyl, manufactured by Nippon Synthetic Chemical Industry) | 50 parts |
| Monoethanolamine salt of dioctyl phosphate | 40 parts |
| Highest quality wheat starch powder | 40 parts |
| Methyl alcohol | 200 parts |

TABLE 3

| Flexographic ink | Color former microcapsules obtained in (1) | Color developer microcapsules obtained in (2) |
|---|---|---|
| No. I (Comparative) | No. (1)-1 | No. (2)-1 |
| No. II | No. (1)-1 | No. (2)-2 |
| No. III | No. (1)-1 | No. (2)-3 |
| No. IV | No. (1)-1 | No. (2)-4 |
| No. V (Comparative) | No. (1)-2 | No. (2)-1 |
| No. VI | No. (1)-2 | No. (2)-2 |
| No. VII | No. (1)-3 | No. (2)-2 |
| No. VIII | No. (1)-4 | No. (2)-2 |

Each of the uniform flexographic inks prepared by thorough stirring in accordance with the above formulation was diluted as necessary with methyl alcohol and then printed on a plain paper of 50 $g/m^2$ by the use of a form printer of flexographic printing type so that the printed amount as solid became 7 $g/m^2$. Thus, there were parepared 8 kinds of colorless backcarbon papers partially coated.

(4) Transferrability test

The printed side of each of the colorless backcarbon papers prepared in the above (3) was superimposed on a plain paper of 50 $g/m^2$. They were passed through a super calender having a line pressure of 100 kg/cm, whereby a blue image was transferred onto the plain paper. The density of the image was measured by the use of a color difference meter of Nippon Denshoku Kogyo and shown in Table 4.

Density of transferred color image = Density of transferred image part—Density of non-image part

TABLE 4

| Flexographic ink | Color former microcapsules | Color developer microcapsules | Density of transferred color image |
|---|---|---|---|
| No. I (Comparative) | No. (1)-1 No wax 7.0 μm | No. (2)-1 No wax 8.0 μm | 0.46 |
| No. II | Same as above | No. (2)-2 n-Paraffin 5 parts 8.0 μm | 0.52 |
| No. III | Same as above | No. (2)-3 n-Paraffin 10 parts 8.0 μm | 0.57 |
| No. IV | Same as above | No. (2)-4 Rice wax 10 parts 8.0 μm | 0.60 |
| No. V (Comparative) | No. (1)-2 No wax 8.5 μm | No. (2)-1 No wax 8.0 μm | 0.48 |
| No. VI | Same as above | No. (2)-2 n-Paraffin 5 parts 8.0 μm | 0.54 |
| No. VII | No. (1)-3 n-Paraffin 10 parts 8.5 μm | Same as above | 0.60 |
| No. VIII | No. (1)-4 Rice wax 10 parts 8.5 μm | Same as above | 0.64 |

As shown in Table 4, the density of the transferred color image formed on a plain paper was markedly improved when microcapsules present in alcohol-based flexographic ink contained a wax, compared with when the microcapsules contained no wax. Further, when the microcapsules contained a wax, transferred images obtained by manual printing test had a practical density.

EXAMPLE 2

With respect to the color developer microcapsules Nos. (2)-1 and (2)-2 prepared in Example 1, the distributions of their particle diameters were measured by the use of a Coulter counter manufactured by Coulter Electronics. The results are shown in FIG. 1. FIG. 1 shows that the color developer microcapsules No. (2)-2 containing 5 parts of a n-paraffin per 100 parts of an oily internal phase, namely, a core substance has a narrower distribution of particle diameters than that of the color developer microcapsules No. (2)-1 containing no paraffin and is more uniform in particle diameter.

EXAMPLE 3

On each of the printed sides of the backcarbon papers partially coated with flexographic ink Nos. I, II, V and VI prepared in Example 1 was superimposed a plain paper of 50 $g/m^2$. A load of 300 $g/cm^2$ was applied on the plain paper and the plain paper was slided, whereby a developed color smudge due to dynamic friction was allowed to appear on the plain paper. The density of the developed blue color was measured by the use of a color difference meter of Nippon Denshoku Kogyo. The results are shown in Table 5.

Density of developed color smudge = Density of smudge part—Density of non-smudge part

TABLE 5

| Flexographic ink | Color former microcapsules | Color developer microcapsules | Particle diameter distribution of color developer microcapsules | Density of developed color smudge |
|---|---|---|---|---|
| No. I (Comparative) | No. (1)-1 No wax 7.0 μm | No. (2)-1 No wax 8.0 μm | Broad | 0.076 |
| No. II | Same as above | No. (2)-2 n-Paraffin 5 parts 8.0 μm | Narrow | 0.051 |
| No. V (Comparative) | No. (1)-2 No wax 8.5 μm | No. (2)-1 No wax 8.0 μm | Broad | 0.090 |
| No. VI | Same as above | No. (2)-2 n-Paraffin 5 parts | Narrow | 0.068 |

TABLE 5-continued

| Flexographic ink | Color former microcapsules | Color developer microcapsules | Particle diameter distribution of color developer microcapsules | Density of developed color smudge |
|---|---|---|---|---|
| | | 8.0 μm | | |

As is apparent from Table 5, addition of a n-paraffin to a core substance of microcapsules makes microcapsule particle diameters more uniform and markedly reduces developed color smudge due to dynamic frinction.

What is claimed is:

1. An alcohol-based flexographic ink for use in colorless backcarbon papers which is composed essentially of (A) microcapsules whose core substance is an oil droplet containing an electron-donating organic color former, (B) microcapsules whose core substance is an oil droplet containing an electron-accepting organic color developer, (C) a binder resin and (D) a solvent composed mainly of a lower alcohol of 1 to 3 carbon atoms, characterized in that either or both of the core substances of the microcapsules (A) and (B) contain a wax.

2. An alcohol-based flexographic ink for use in colorless backcarbon papers according to claim 1, wherein the amount of a wax is 50% by weight or less by weight based on the total amount of the core substance.

3. An alcohol-based flexographic ink for use in colorless backcarbon papers according to claim 1, wherein there is further added, as an improver for transferred image density, a mono-, di- or tri-ester between an aliphatic alcohol whose alkyl group has 6 to 18 carbon atoms and phosphoric acid, or a salt thereof.

4. An alcohol-based flexographic ink for use in colorless backcarbon papers according to claim 1, wherein the main film material of the microcapsules (A) and (B) is a melamine-formaldehyde resin or an urea-formaldehyde resin.

5. An alcohol-based flexographic ink for use in colorless backcarbon papers according to claim 1, wherein the microcapsules (A) and (B) have an average particle diameter of 3 to 15 μm.

6. An alcohol-based flexographic ink according to claim 5 wherein the microcapsules (A) and (B) have an average particle diameter of 6–10 μm.

7. An alcohol-based flexographic ink according to claim 1 wherein the solvent consists essentially of methyl alcohol, ethyl alcohol, isopropyl alcohol, n-propyl alcohol or mixtures thereof.

8. An alcohol-based flexographic ink according to claim 7 wherein the solvent consists essentially of methyl alcohol or ethyl alcohol.

9. An alcohol-based flexographic ink according to claim 7 wherein there is present in addition to the alcohol as a main component a small amount of water, methyl acetate, ethyl acetate, butyl acetate, methyl cellosolve or ethyl cellosolve.

10. An alcohol-based flexographic ink according to claim 2 wherein the amount of wax is 2 to 7% by weight based on the total amount of the core substance.

11. An alcohol-based flexographic ink according to claim 1 wherein the wax is a paraffin wax or rice wax.

* * * * *